July 1, 1930.  A. ISLIKER  1,769,223

ELECTRIC FURNACE PROCESS AND APPARATUS

Original Filed July 23, 1923   2 Sheets-Sheet 1

Inventor:
Albert Isliker.
by
Attorney.

Witness:
Walter Chism.

July 1, 1930.  A. ISLIKER  1,769,223
ELECTRIC FURNACE PROCESS AND APPARATUS
Original Filed July 23, 1923  2 Sheets-Sheet 2
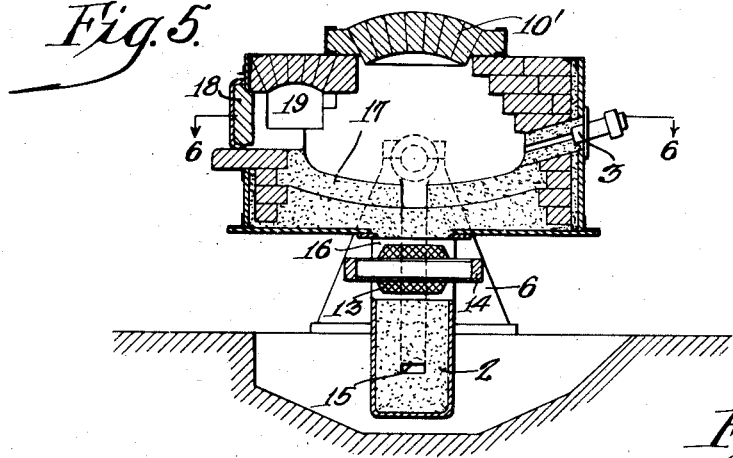
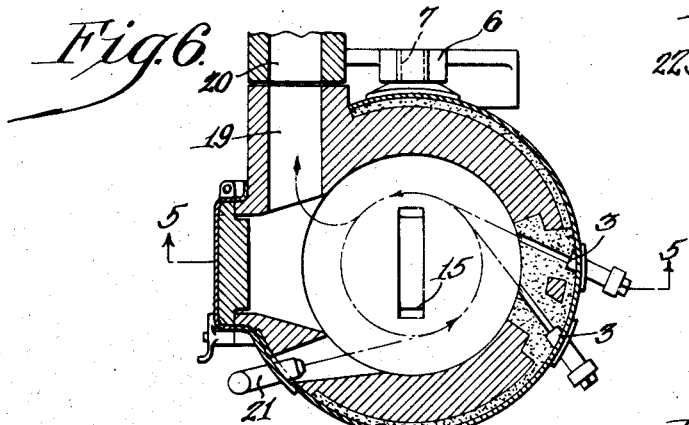
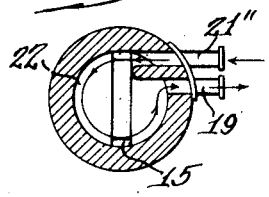
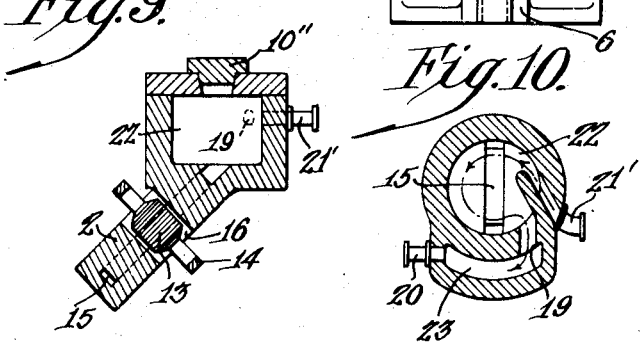
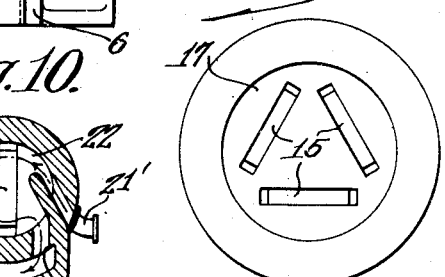
Inventor
Albert Isliker
Witness:

Patented July 1, 1930

1,769,223

UNITED STATES PATENT OFFICE

ALBERT ISLIKER, OF GENEVA, SWITZERLAND, ASSIGNOR TO THE AJAX METAL COMPANY, OF PHILADELPHIA, PENNSYLVANIA, A CORPORATION OF PENNSYLVANIA

ELECTRIC FURNACE PROCESS AND APPARATUS

Application filed July 23, 1923, Serial No. 653,311, and in Switzerland August 23, 1922. Renewed June 26, 1929.

The object of the present invention is to provide a process for fusing, extracting, affining, refining and distilling metals and metal wastes, for example for the transformation of waste brass to copper and oxide of zinc, of zinc to oxide of zinc, of copper sulfide ores to matte or to copper, etc., and an arrangement for carrying out the process.

According to the invention the process consists in blowing gases, for example air, into the bottom of the charge through one or more tuyères, with or without the aid of scorifying or slagging agents, and in a converter or furnace in which heat is applied or the temperature is maintained by an electrically induced current in the metal and circulation is assisted by the same means. The preliminary fusion of the charge may or may not be made in the furnace or converter used to carry out my process and this furnace or converter uses one or more submerged induction canals or channels. The canal or canals are completely submerged in the molten bath to have constant resistance, to combat by the weight of the metal above them the pinch effect of currents induced in them and to obtain a bath having a simple accessible surface and a massive form. All these insure proper circulation between the canal or canals and the bath.

A typical example of the induction furnace is given in Swiss Patent No. 89875. class 113, of The Ajax Metal Company of Philadelphia, U. S. A., which is adapted to supply any portion or all of the requisite heat, while blowing gas into the bath, or to give or to maintain the temperature favorable to the processes or reactions, or still more easily that needed for fluidity of the bath to the end of the operation.

The gases may be blown in upon the surface of the liquid bath instead, or both through the metal and above it.

The arrangement to carry out the process comprises a furnace to receive the charge, or a converter having one or more tuyères for blowing gas into the liquid charge, and having one or more openings for charging, operating, evacuating gaseous reaction-products and entrained materials with these gases, and of emptying,—having in its lower portion and arrangement for heating by electric induction, of which the canal or canals for induction are placed so as to be entirely submerged by the bath, to combat pinch effect by the weight of metal above, to obtain an unbroken and accessible surface and a massive form of bath, insuring proper circulation between the canal or canals and the bath.

The tuyères may be placed so as to blow the gases upon the surface of the liquid bath.

Several forms are shown in the drawings, applying both to the apparatus and to the process.

Figures 1, 2, 3 and 4 represent a furnace converter in which Figure 1 is a vertical section, Figure 2 a horizontal section, Figure 3 a vertical section perpendicular to that of Figure 1, and Figure 4 is a transverse section of the electric heater.

Figures 5 and 6 represent a refining furnace, of which Figure 5 is a vertical section and Figure 6 is a horizontal section.

Figures 9, 10 and 11 represent different distillation furnaces, of which Figure 9 is a vertical section, Figure 10 a horizontal section of a furnace for simple distillation and Figure 11 a horizontal section of a furnace for distillation serving for the production of oxides, e. g., oxide of zinc.

Figure 12 is a plan view of a furnace having three induction canals.

Figure 1:
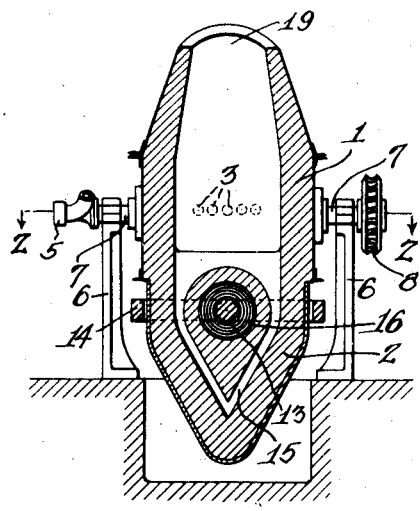
Figure 3:
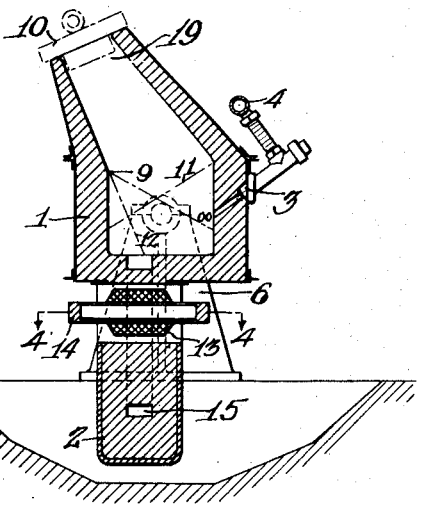
Figure 2:
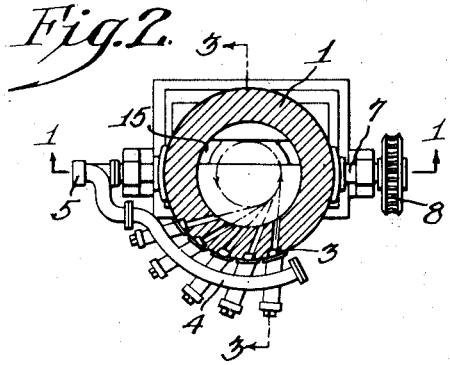
Figure 4:
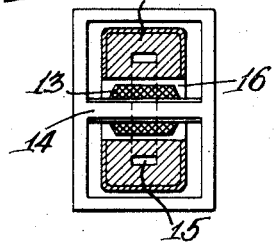

In the different figures are reference numbers relating to the description.

Figures 1 to 4 show the invention as a converter, e. g., for the extraction of copper from cupriferous waste and also, particularly from brass. It is a modification of the "Bessemer" principle, long used for the production of crude copper carrying mattes (sulfides of iron and copper) and lately used with scrap brass.

When converting copper mattes by the insufflation of compressed air, a portion of the expelled metals is scorified and another portion volatilized; the sulfur is oxidized and is expelled as $SO_2$. In this case it is the combustion of the sulfur and the scorification of the iron, &c. which furnishes the necessary heat for the reaction and which maintains the bath liquid until the operation is ended.

When converting brass, a common operation in Germany, the liquid brass is put into the converter, and it is the oxidation in the bath of a portion of the zinc by the insufflating air that gives the heat. The rise in temperature evaporates another part of the zinc which however is immediately oxidized by the oxygen of the excess air, which carries this oxide outside of the converter.

Inasmuch as only a part of the zinc oxides in the bath is thus furnishing heat, and as toward the end of the operation this heat is no longer sufficient, the operation has had to be stopped before complete expulsion of the zinc in order to avoid the solidification of the metal and its disastrous effects upon the lining of the converter.

The converter having electric induction heating through channels or canals beneath the pool, as in Figures 1 to 4, permits pushing the operation to the end without fear of solidification, in that the furnace procures needed heat from the electric current during the operation. Moreover it can supply part of the heat of vaporization to assist in the vaporization of the zinc. The oxide of zinc cannot be dirtied by the combustible or the fumes from the conbustible as no combustible is used. Further the scrap can be melted in the converter itself instead of in a foundry furnace, thus doing away with the need for a foundry furnace.

A larger quantity of zinc can therefore be extracted in such a furnace in the form of oxide instead of having to scorify the remaining zinc in a subsequent operation in another furnace.

In Figures 1 to 4, 1 is the body of the converter to which is added in its lower part the arrangement for induction electric heating 2. 3 are the tuyères fed from the header 4 in turn fed from the compressed air main 5. 6, 7 and 8 show the standards, trunnions and worm gear of a tipping arrangement for the converter. 9 indicates the level of the bath at the end of fusion when the cover 10 is applied to the mouth 19 of the converter.

11 indicates the level of the bath while converting. 12 indicates the level after pouring. 13 is the primary coil and 14 the iron armature of the transformer inducing current in the induction canal 15. A current of air may be blown across the space 16 to cool the primary coil.

The tuyères 3 may have a tangential direction (Figure 2) in order to give a circular movement to the bath for better mixing. Instead of compressed air, air may be used enriched by oxygen, or oxygen or other gas containing oxygen may be used.

The converter described may serve equally well to convert zinc, e. g., waste zinc, to zinc oxide. It can moreover treat other metals and materials adapted to be treated in a converter.

Figures 5 and 6 show the invention as a refiner. 17 is the bottom, e. g., of silica sand, and is surmounted by the lid of the furnace 10' (a spherical shell portion). 13, 14, 15 and 16 show the same arrangement for electric induction heating as in Figures 1–4. 6, 7 and 8, as before, are the members for tipping the furnace.

18 serves for charging, for the removal of slag, for making additions to the bath and for pouring. The connecting flues 19 and 20 having outlet to the chimney serve for the evacuation of gases and volatile portions of the charge. The tuyères 3 provide for insufflation of air into the bath, while tuyère 21 permits insufflation of air upon the surface of the bath to assist oxidation and scorification. These tuyères, 21 and 3, can have a tangential direction in order to give to the gas or to the bath a circular movement, in the one case to cover the whole surface of the bath and in the other to better mix the liquid. The tuyère 21 may be used also to admit a reducing agent over the bath, e. g. carbon monoxide.

The evacuation flue 19 is placed in the wall of the gateway 18, or near to it, to prevent the entry of air to the bath when the gate is open; and at the same time it is placed so that gases entering at the tuyère 21 have to cover the whole or nearly the whole surface of the bath before reaching it.

The arrangement described is effective for any of the normal operations of refining, namely, oxidizing fusion, oxidation, scorification, poling and reduction.

The arrangement described using the induction heater can serve additional aims, e. g. to supply the necessary heat to evaporate or assist in the evaporation of metals or volatile materials like zinc found in the charge; to transform copper sulfide ores directly to matte or copper by the processes called "pyritic smelting" or "semi-pyritic smelting", or the "knudsen" process, furnishing the needed heat to obtain an ultimate deficiency of sulfur in the ore, or to suppress or reduce the addition of combustibles. The arrangement will thus permit extracting copper from ores in countries lacking combustibles but having available hydraulic power.

Figures 9 and 11 show the invention applied as a furnace to distill zinc and other volatile metals for the purpose of oxidizing the vapors, e. g., to zinc white.

21' is the tuyère for the introduction of the reducing or neutral gas and 19 is the flue for evacuating the gases or vapors. The tuyère and flue permit conducting the metallic vapors outside of the furnace for oxidation in a separate apparatus with oxygen or with air.

Figures 9 and 10 show the invention applied as a furnace to distill volatile metals, e. g., zinc.

The vessel 22 receives the metal from the foundry for distillation. The transformer in its relation to the heating (secondary) channel is shown at 13, 14, 15 and 16 and provides induction and circulation heating. It may be inclined as illustrated in Figure 9 in order that metallic vapors formed in the canal may not interrupt the induced electric circuit of the canal. The tuyère 21' provides for the introduction of a reducing or neutral gas and the flue 19' permits drawing off vapors and gases. 23 forms a receiver for condensed metal and the noncondensed gases and vapors find outlet at 20. The receiver 23 may also be provided with a heating element to avoid the formation of zinc powder when the distillation is too rapid. It may also be made separate from the furnace.

The flues 21 and 19 of these distillation furnaces can be so placed that the reducing or neutral gas travels between them over the whole surface of the bath. In Figures 10 and 11 this condition is attained by a tangential placement. It is known that if the zinc destined for oxidation by distillation or partial converting contains lead, the oxide of zinc obtained is colored yellow by the oxide of lead which depreciates the product. In regard to this, the arrangement is adapted to the admission of the oxides of carbon, $CO_2$ or a mixture of $CO_2$ and $CO$ or of a gas containing them, to oxidize the lead vapors to carbonates, which are white, without altering the zinc white, or it can then be separated more easily from the oxide of zinc, being heavier.

In constructing the furnace in the form shown in Figures 1–4 I foresee good results for some of my purposes by constructing the channel portion and the lower part of the pool wall out of bauxite and chrome (neutral) using magnisite for the upper part of the furnace body. In the form shown in Figures 5 and 6 I foresee good results for some of my purposes using tamped bauxite and chrome (neutral) for the channel portion up to the bottom of the pool groove and for the portion of the side wall immediately surrounding the tuyères, using tamped silica (sand) for the pool bottom and for the walls of the pool groove between the upper part of the channel and the bottom of the pool. This gives an acid pool. I foresee the use of silica brick above the pool and such a neutral heat insulation material between the brick and the metal casing as kieselguhr.

In all of the forms I contemplate supporting the lining of whatever character by a metal casing.

The arrangement shown can also serve for the reduction of oxides to the metallic state. This metal can then be distilled for purification or again oxidized while a vapor. It can also be used as a converter or refining furnace.

Instead of extracting the volatile metals by converting, the alloy might be submitted to distillation. In this case the volatile metal, as zinc, in the arrangements of Figures 9 to 11, can be collected in the metallic state or converted into oxide from metallic vapor. The arrangement described can serve equally well for the simple fusion of metals, for example those easily oxidizable, in view of preventing the oxidation.

The furnace described might have any form of bottom instead of circular, as square, rectangular, oval, elongated, &c.

Figure 7:
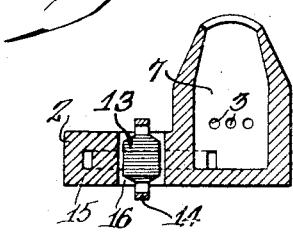
Figure 7 is a vertical section of a converter having a lateral arrangement for heating.

Figure 7 shows the invention having a lateral disposition of heating element. It might also be inclined as in Figure 9.

Figure 12 represents the invention with three canals or channels for induction; each can for example receive one phase of a three phase current.

Figure 8:
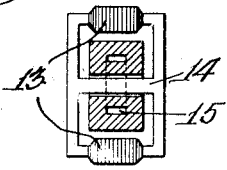
Figure 8 is a horizontal section showing a modification of the electrical heating arrangement having two primary coils upon the outside.

There may be one or more canals or channels for induction, placed diversely, e. g., one on either side. The induction coils may be placed outside of the canals, as indicated in Figure 8.

It will be evident that the stirring due to circulation in the channels in the electric furnace and the stirring due to air or gas below the surface, with or without entrained gases or finely divided solid matter, mutually cooperate, the electro-dynamic stirring assisting in the mixing of the gas with the entire body of the metal and the stirring from the gaseous blast securing more uniform temperature throughout the mass at any given time. The assistance of the electro-dynamic stirring is most needed and effective toward the close of the gaseous blast so that the stirring may be maintained for the completion of the reaction even though the gas has been shut off. This avoids danger of burning out ingredients through excess of blast and secures a more homogenous product.

Having thus described my invention, what I claim as new and desire to secure by Letters Patent is:

1. In the art of insufflation of molten metals with gas and with or without scorifying agents, the novelty which consists in electrically heating and stirring the metal from beneath during or in close time relation with the insufflation, introducing the insufflating stream at a considerable angle to the paths of stirring.

2. In the invention according to claim 1, the novelty which consists in utilizing the insufflating stream to stir in definite planes.

3. In the invention according to claim 1, the novelty which consists in introducing the insufflating stream nearly tangentially.

4. In the invention according to claim 1, the novelty which consists in introducing the insufflating stream so as to stir in definite planes, the direction of the stream being nearly tangential.

5. In the invention according to claim 1, the novelty which consists in holding the stream to its course by partition walls to avoid short-cutting.

6. In the invention according to claim 1 the novelty which consists in holding the stream to its course by partition walls to avoid short-cutting and slagging the charge.

7. In the invention according to claim 1, the novelty which consists in holding the insufflating stream to a course within definite planes by partition walls to avoid short-cutting.

8. In the invention according to claim 1, the novelty which consists in holding the insufflating stream to a substantially tangential course within definite planes by partition walls to avoid short-cutting.

9. In the invention according to claim 1, the novelty which consists in supplying a slagging agent for the charge and in utilizing the combined stirring effects produced to increase the speed of slagging.

10. The art of treating molten metals and alloys, which comprises vaporizing metals in regions below the surface of a metallic bath while maintaining a non-oxidizing atmosphere over the bath into which the metal vapors pass and electromagnetically assisting the movement of the vaporized metal through the body of the bath.

11. The art of treating molten metals and alloys, which comprises vaporizing metals in regions below the surface of a metallic bath while maintaining a non-oxidizing atmosphere over the bath into which the metal vapors pass, electromagnetically assisting the movement of the vaporized metal through the body of the bath by molten metal circulation upwardly therethrough, and removing the mixed metal vapor and atmosphere simultaneously and continuously for further treatment of the metal vapor.

12. The art of treating molten metals and alloys, which comprises vaporizing metal in regions below the surface of a metallic bath while maintaining a reducing atmosphere above the bath with which the metal vapors mix, electromagnetically assisting the movement of the vaporized metal through the body of the bath by molten metal circulation upwardly therethrough, and withdrawing the mixed vapors for further treatment of the metal vapor.

13. The art of treating molten metals and alloys, which comprises maintaining the bath molten by induced electric heating of the bath sufficient to vaporize metal, at points below the surface of the bath, maintaining a protecting atmosphere above the bath with which the metal vapor mixes, electromagnetically assisting the movement of the vaporized metal through the body of the bath by molten metal circulation upwardly therethrough, and removing the mixture for further treatment of the metal vapor.

14. The art of treating molten oxidizable baths, which comprises heating the bath at a point below the surface of the bath by electric induction sufficient to produce local vaporization of a constituent and to supply sufficient heat to also maintain the whole bath molten, maintaining a non-oxidizing atmosphere over the bath with which the vaporized constituent mixes, electromagnetically assisting the movement of the vaporized metal through the body of the bath by molten metal circulation upwardly therethrough, and removing the resulting gaseous mixture for further treatment of the vaporized bath constituent.

15. The art of treating molten oxidizable baths, which comprises heating the bath at a point below the surface of the bath by electric induction sufficient to produce local vaporization of a constituent and to supply sufficient heat to also maintain the whole bath molten, maintaining a reducing atmosphere over the bath with which the vaporized constituent mixes, electromagnetically assisting the movement of the vaporized metal through the body of the bath by molten metal circulation upwardly therethrough, and removing the resulting gaseous mixture for further treatment of the vaporized bath constituent.

16. The art of treating molten baths containing oxidizable impurities, which comprises blowing the bath until the oxidation has progressed to a point at which the limpidity of the bath reduces and heat is no longer supplied to the bath by oxidation of impurities, then supplying additional heat by electric induction sufficient to vaporize a constituent of the bath and maintain the bath molten, said heat being applied at points below the surface of the bath, and directing onto the surface of the molten bath an atmosphere imparting movement to the bath and continuously removing the mixture of atmosphere and constituent vapor for further treatment of said vapor.

17. The art of treating molten oxidizable baths, which comprises heating the bottom of the bath by electric current induced within the metal, blowing the bath with a non-oxidizing atmosphere at a point between the heating zone and surface of the bath, maintaining a non-oxidizing atmosphere over the bath and into which the vapors of the bath enter, and removing the mixed gases from the surface of the molten bath for further treatment of the vapors.

18. The art of treating molten baths, which comprises heating molten metal below a pool of the metal with which it communicates and blowing the metal above the heating zone and below the surface of the bath.

19. The art of treating molten baths, which comprises heating molten metal below the surface of a pool of the metal with which it communicates and blowing the bath above the heating zone and below the surface of the bath and also in a tangential direction onto the surface of the bath.

20. The art of treating molten baths, which comprises heating molten metal below the surface of a pool of the metal with which it communicates and blowing the bath above the heating zone and below the surface of the bath and also onto the surface of the bath.

21. The art of treating molten baths which comprises electromagnetically heating and stirring molten metal at a point far below the surface thereby also circulating molten material of the bath and blowing the bath beneath the surface of the pool across the path of circulation caused by said electric heating.

22. The art of treating molten baths which comprises electromagnetically heating and stirring molten metal at a point far below the surface thereby also circulating molten material of the bath and blowing the bath with a non-oxidizing atmosphere beneath the surface of the pool across the path of circulation caused by said electric heating, while maintaining a non-oxidizing atmosphere above the surface of pool, removing the resulting mixed gases for further treatment.

23. The art of treating molten baths which comprises heating a bath below a pool of molten material thereof and shifting the bath to a position for blowing across the heating zone, while maintaining the heating, but below the surface of the pool.

ALBERT ISLIKER.